Sept. 19, 1961     E. C. RYAN     3,000,107
AGRICULTURAL MACHINE FOR TRANSPORTING, DRYING
AND MIXING GRANULAR MATERIAL
Filed Feb. 20, 1959     5 Sheets-Sheet 1
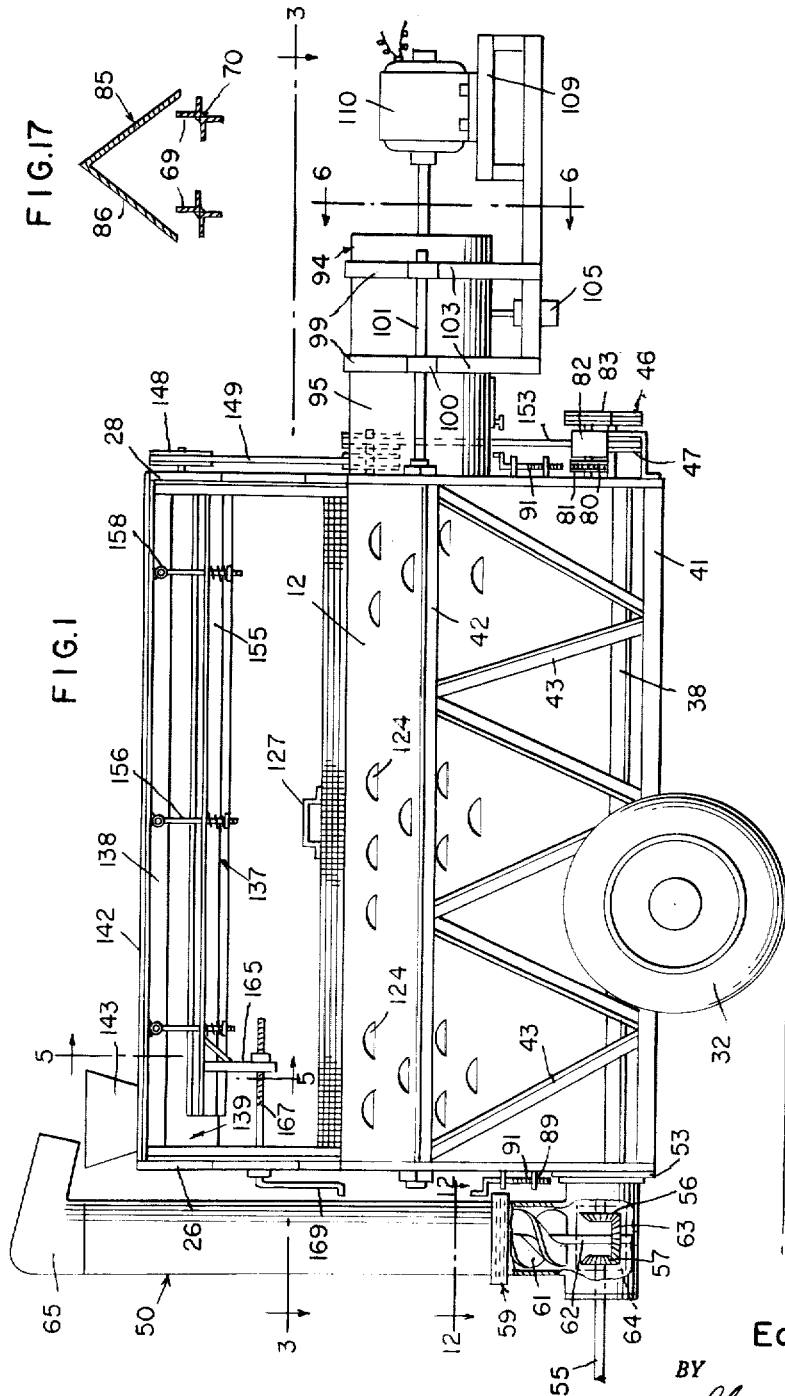
INVENTOR.
Edmund C. Ryan
BY
Shoemaker & Mattare
ATTYS Sept. 19, 1961　　　　　　E. C. RYAN　　　　　　3,000,107
AGRICULTURAL MACHINE FOR TRANSPORTING, DRYING
AND MIXING GRANULAR MATERIAL
Filed Feb. 20, 1959　　　　　　　　　　　　5 Sheets-Sheet 2
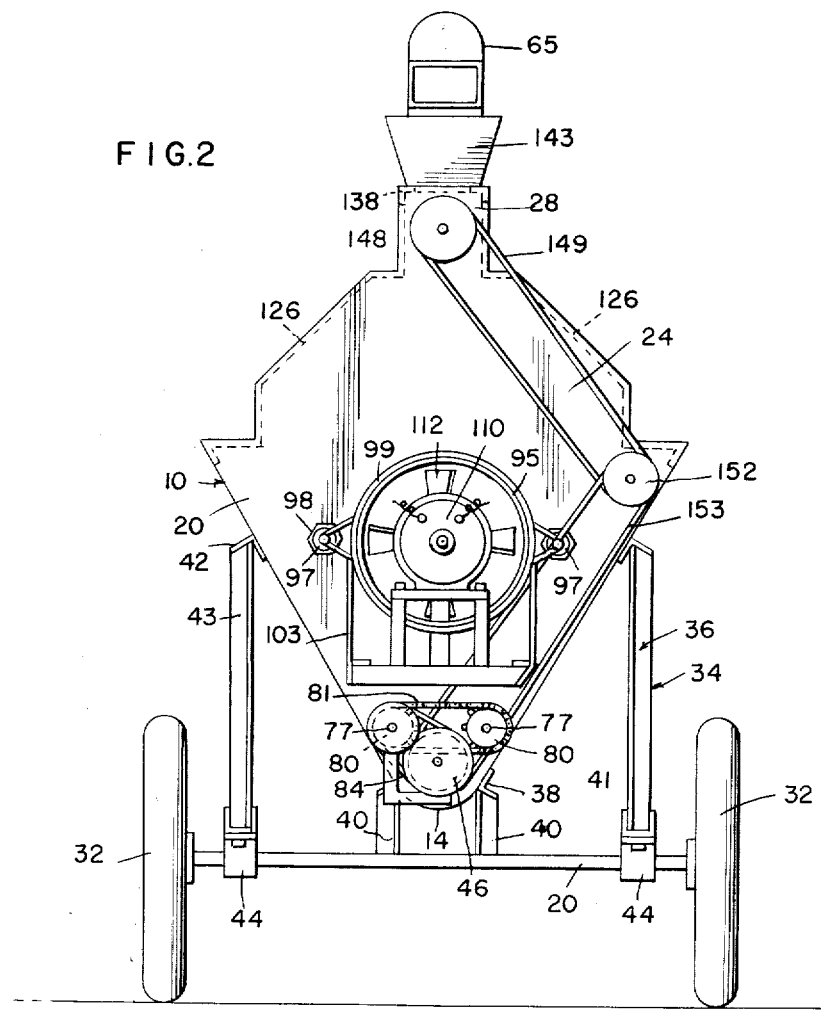
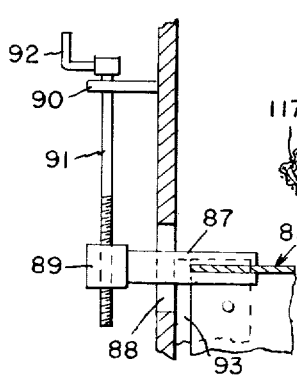
INVENTOR.
Edmund C. Ryan
BY
Shoemaker & Mattare
ATTYS

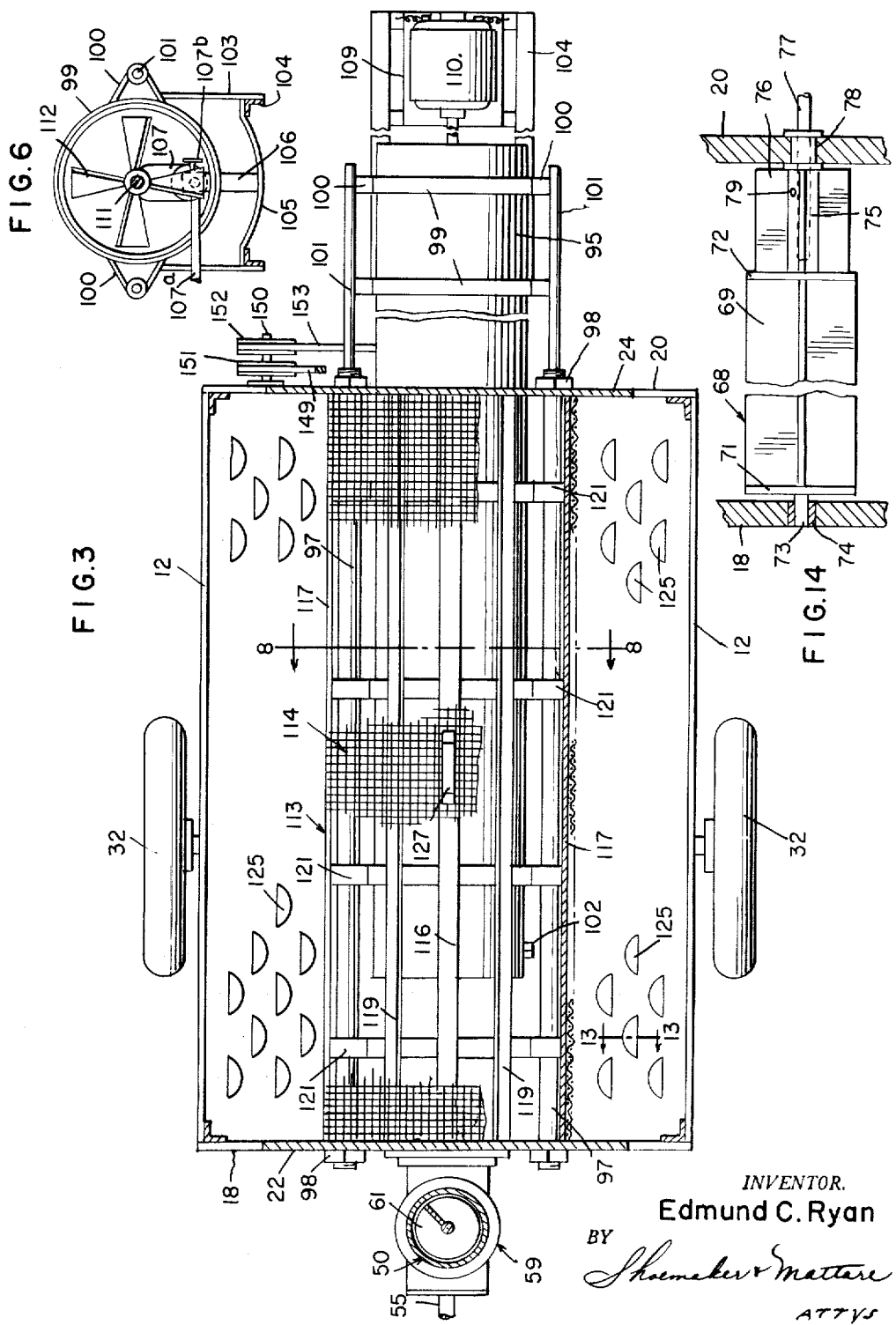

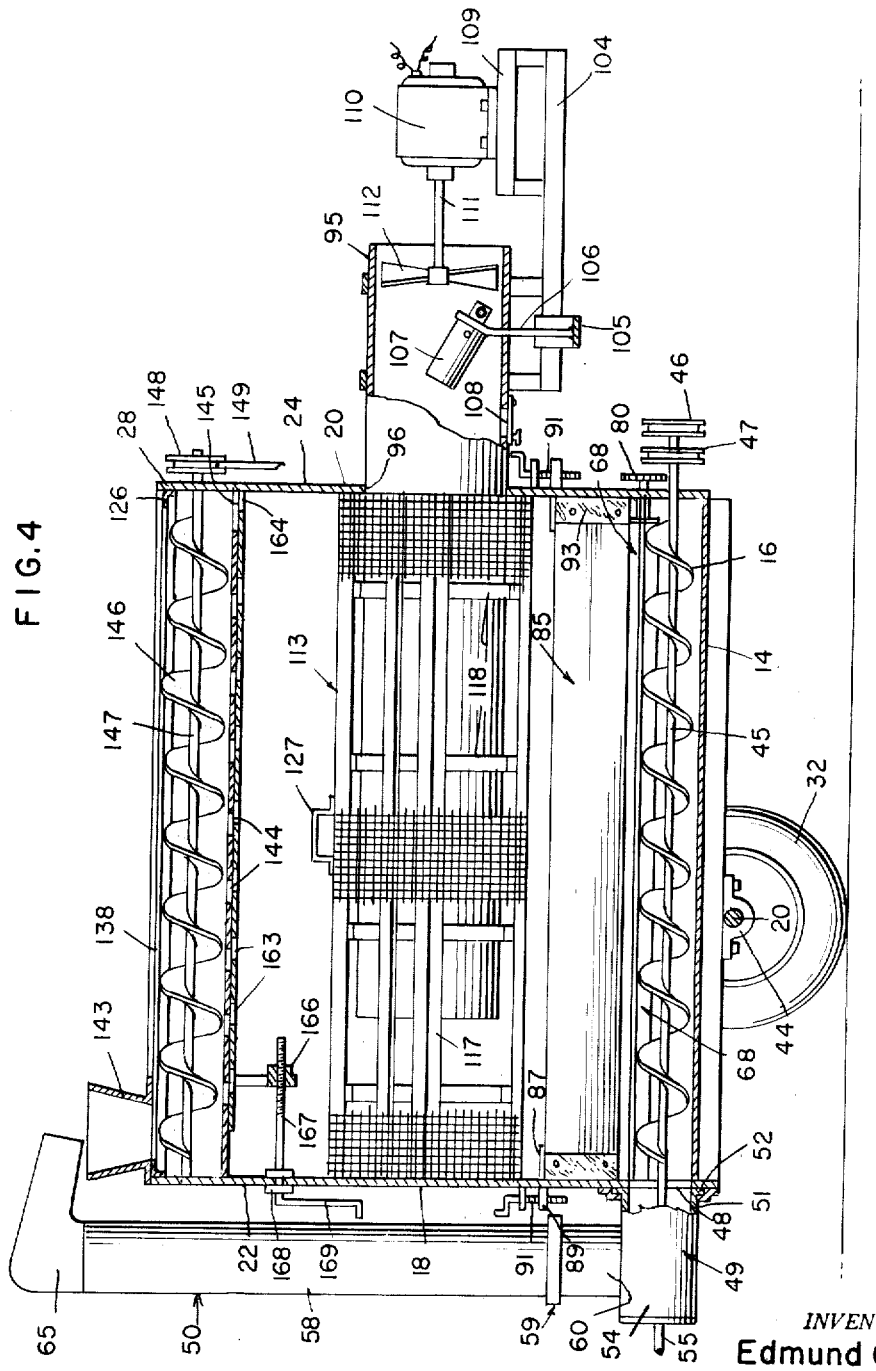

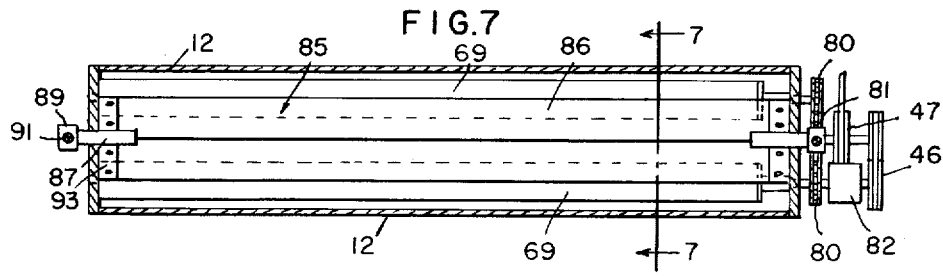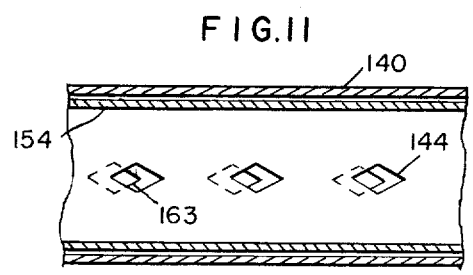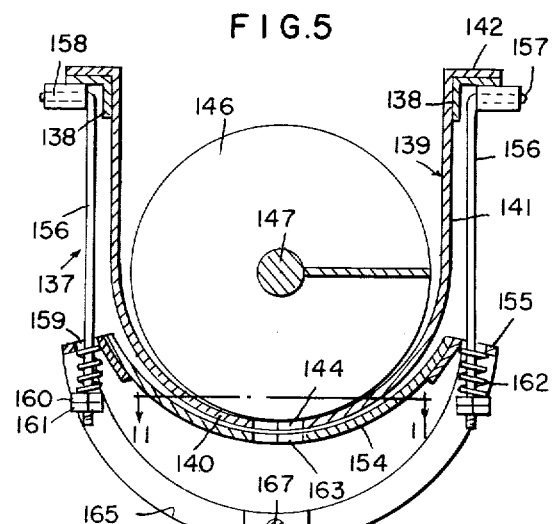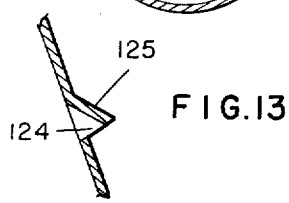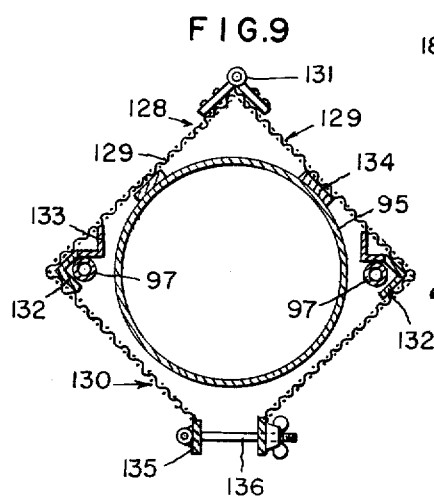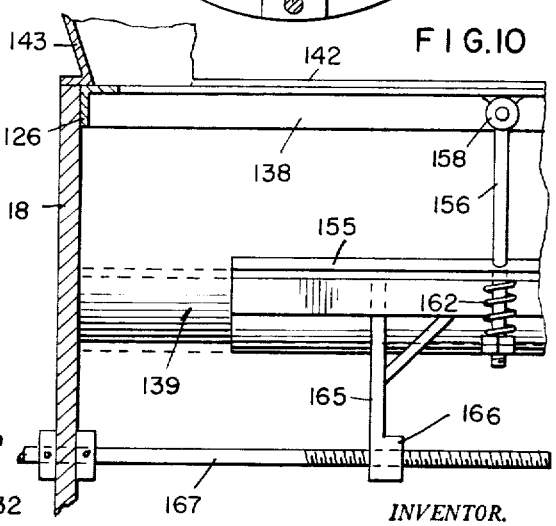

3,000,107
AGRICULTURAL MACHINE FOR TRANSPORTING, DRYING AND MIXING GRANULAR MATERIAL
Edmund C. Ryan, Monona, Iowa
Filed Feb. 20, 1959, Ser. No. 794,690
18 Claims. (Cl. 34—102)

This invention relates generally to new and novel improvements in agricultural machines and is directed particularly to a machine which is designed to perform a number of different operations in connection with the handling of grains and other materials.

In the operation of farms directed to the raising of vegetable produce such as corn, wheat and many other types of grains, many different operations are carried out, particularly during the harvesting season, which require the use of different types of mechanical structures.

Considering, for example, the harvesting and storing of grains, some type of conveyance is required to receive the grain in the field and transport it to a place of storage and the grain must then be transferred from the conveyance to the storage bin or other area where it is to remain either permanently or for a predetermined time. In this connection conveyances are known which are equipped with means for elevating the harvested grain or other material into a storage bin or other receiver. However, there are conditions where it is necessary or desirable that such grains be dried to some extent before storage and in this case the transference of the grain from the conveyance in which it was transported to drying equipment becomes necessary and accordingly extra handling of the grain is involved.

It is accordingly an object of the present invention in the light of the foregoing, to provide a multi-purpose conveyance which is designed to perform the functions of two or more separate or individual structures or pieces of equipment which are at present employed for carrying out the individual operations above referred to.

More particularly it is an object of the present invention to provide a conveyance which is constructed and equipped to transport material such as grain or the like from the field or other areas, to then dry the material to the extent desired in preparation for storage, and to then transfer the grain from the conveyance in which it has been dried to the storage bin, silo or other structure.

Another problem associated with the use of present known equipment for treating grains for the purpose of reducing the moisture content thereof, is in obtaining a uniform drying temperature in the equipment and consequently producing uniform drying of the grain.

It is a further object of the present invention to provide a structure of the character hereinbefore described in which a novel arrangement of force draft and air heating means is provided which will uniformly distribute the air, heated or unheated, through the structure and the grain therein whereby to accomplish the desired extent of drying in a minimum of time.

Still another object of the invention is to provide an agricultural machine of the character stated which may be operated to perform several functions of receiving the grain in the field and conveying it to a desired location; drying the grain before or in preparation for storage; transferring the grain from the conveyance to a storage area and also providing a means whereby the combining and mixing of feed mixtures may be readily accomplished.

A still further object of the invention is to provide in a machine designed to accomplish the functions above outlined, a mechanism whereby grain or other material carried in the lower portion of the machine which is in the form of a receptacle or wagon body, can be elevated into the upper part of said body and then be discharged downwardly for treatment during such descent and wherein a novel regulating valve is associated with the mechanism in the upper part of the body by which to regulate the flow of the material therefrom.

Still another object of the invention is to provide in a machine structure of the type referred to in the preceding paragraph, a removable foraminous hood or cover interposed between the upper structure and the lower part of the body over which hood the material is caused to flow and to be distributed laterally in the body while being subjected to the drying or dehumidifying effect of air being caused to flow upwardly under pressure through the hood.

In addition to the foregoing, an object of the invention is to provide such a foraminous hood with means for removably supporting it in the receptacle or wagon body and having in association with the lower part of the body a mechanism designed to be used as a feed mixer so that feed material may be conveyed from the lower part of the body into the distributing means in the top or upper part thereof and discharged downwardly to receive a thorough mixing through the action of the elevating and discharging means as well as the mixer mechanism located in the lower part of the body.

A still further object of the invention is to provide in a machine of the above described character, a novel hot air delivering unit supported entirely by the receptacle or wagon body and adapted to be shifted relative to such body and with respect to the hereinbefore referred to foraminous hood whereby to accomplish the desired even delivery and distribution of heated air into and through the receptacle and through the foraminous hood beneath which the air is introduced.

The invention broadly contemplates the provision of a receptacle or wagon body suitably supported for movement over the ground and embodying downwardly converging side walls and end walls of greater height than the side walls, with a conveyor trough structure supported between the end walls at the top thereof and extending longitudinally of the body. The trough portion of such structure is provided with bottom discharge openings and mounted in a novel manner beneath the trough for adjustment relative thereto is a valve plate having corresponding openings which can be brought into registry with the openings of the trough to regulate the rate of distribution of material from the trough into the lower part of the receptacle body.

The bottom portion of the receptacle body also carries a conveyor or material moving unit extending longitudinally of the body and operating to move material in the body toward and through one end wall into an elevator which may be positioned to carry the material upwardly and discharge it into the upper conveyor structure.

Interposed between the upper and lower material moving or conveyor structures is a screen unit in the form of an elongated housing having foraminous top walls forming a hood covering a heat pipe in the manner hereinafter described and having foraminous lower walls so as to provide with the top walls a heat pipe encasing structure. This foraminous housing is mounted for complete removal from the wagon body or receptacle.

Extending through one end wall is an elongate heat pipe or tube which is supported upon longitudinal supporting bars lying within the receptacle whereby it can be moved longitudinally in and out with respect to the interior of the foraminous walled housing and outwardly of the receptacle there is supported a hot air producing means and a forced draft producing mechanism which is connected with the heat pipe or tube to be moved therewith.

By reason of the novel mounting of the foraminous walled housing and the heat pipe or tube which extends thereinto, whereby these units can be completely disassociated from the receptacle body, the latter may be employed for the mixing of feed material and to that end it is provided in the lower part thereof with rotary agitators operating at opposite sides of a longitudinally extending deflector shield which is closely adjacent to the bottom conveyor so that continuous circulation of the feed material from the bottom of the receptacle to the top conveyor structure and back down into the bottom of the receptacle can be effected and in such circulation the agitator members cooperate with the conveyors to produce a thorough mixing of the feed material.

The invention will be best understood from a consideration of the following detail description taken in connection with the accompanying drawings forming part of the specification, with the understanding, however, that the invention is not confined to a strict conformity with the showing of the drawing but may be changed or modified so long as such changes or modifications mark no material departure from the salient features of the invention as expressed in the appended claims.

In the drawings:

FIG. 1 is a view in side elevation of an agricultural machine constructed in accordance with the present invention, portions of the structure being broken away and in section to show details of construction;

FIG. 2 is a view in elevation looking at the back end of the machine;

FIG. 3 is a longitudinal section in the horizontal plane taken substantially along the line 3—3 of FIG. 1;

FIG. 4 is a longitudinal section in a vertical medial plane through the body of the structure and showing certain units partially in section and partially in side elevation;

FIG. 5 is a sectional view taken substantially on the line 5—5 of FIG. 1;

FIG. 6 is a sectional view taken substantially on the line 6—6 of FIG. 1 looking in the direction of the arrows or toward the inlet end of the heat tube or pipe;

FIG. 7 is a longitudinal section taken in a horizontal plane through the lower portion of the receptacle body only and directly above the agitator blades and the material distributing canopy lying thereover;

FIG. 8 is a sectional view taken transversely through the heat pipe and the screen or foraminous walled housing therearound;

FIG. 9 is a transverse section corresponding to FIG. 8 and illustrating another construction of the heat pipe encasing housing, which latter housing is adapted to be opened out in two sections for removal from the receptacle;

FIG. 10 is a side view on an enlarged scale of one end portion of the upper conveyor trough and adjacent valve plate showing the suspension means for the latter and the means for adjusting it relative to the adjacent conveyor trough;

FIG. 11 is a sectional view taken substantially on the line 11—11 of FIG. 5;

FIG. 12 is a section taken substantially on the line 12—12 of FIG. 1;

FIG. 13 is a fragmentary detail section taken on the line 13—13 of FIG. 3;

FIG. 14 is a detail illustrating the coupling between one of the pair of agitators and the supporting stub shaft through which rotary power is transmitted to the agitator and showing a protective break pin mounting;

FIG. 15 is a perspective view illustrating the detail feature shown in FIG. 14;

FIG. 16 is a detail view on an enlarged scale showing the adjustable support for one end of the canopy, a portion of the adjacent end wall being in vertical section;

FIG. 17 is a sectional view taken substantially on the line 17—17 of FIG. 7.

Referring now more particularly to the drawings, it will be seen upon reference to FIGS. 1, 2 and 3 that the machine of the present invention is supported in a manner to be readily transported over the ground, the supporting means here being illustrated in the form of tired wheels but obviously any other suitable support may be employed such as ground engaging runners or the like.

The machine supported upon the wheeled frame embodies a receptacle which is generally designated 10 and which may for convenience be generally referred to as a wagon body. This receptacle body comprises the side walls 12, which are arranged in downwardly convergent relation and are joined by the substantially semi-circular or semi-cylindrical bottom wall portion 14 which wall in addition to forming an integral part of the body structure, also forms and may be referred to as a bottom auger trough in which is positioned a material moving unit in the form of a conventional auger or screw which is designated 16. The receptacle body further comprises the vertical front and back walls 18 and 20 respectively which are of generally triangular form as best shown in FIG. 2 where the back wall 20 is illustrated and each of these end walls includes an upstanding panel designated 22 and 24 respectively for the front and back of the structure. These panels 22 and 24 have upwardly converging side edges so that they are gradually reduced in width as they extend upwardly and they terminate in the vertical center portions thereof in the front and back upstanding plates 26 and 28 respectively.

The under-carriage for supporting the receptacle body comprises a transverse axle 30 carrying or supported at each end by a suitable tired wheel 32 and this under-carriage supports the body sustaining structure which is generally designated 34. Such body sustaining structure may, of course, take different forms for mounting the receptacle body and the parts carried thereby upon the wheeled under-carriage but preferably it consists of the two longitudinally extending vertical frame units each of which is designated 36 and which are interposed between the axle 30 and the upper portions of the receptacle body side walls 12 and the sustaining structure also includes a pair of longitudinally extending channel beams 38 which are fixed to and extend longitudinally of the side walls 12 where the latter join the underlying bottom wall portion 14, as shown in FIG. 2. These channel beams are mounted upon and connected to the underlying axle 30 by the upstanding posts 40.

Each of the outlying frames 36 consists of a lower longitudinal beam 41, an upper longitudinal beam 42 here illustrated as being of channel form, and the intermediate connecting and bracing angle beam struts 43 which as shown in FIG. 1 are arranged in alternately inclined positions so as to give maximum rigidity to the frame structure.

The lower longitudinal beams 41 are secured in a suitable manner to bearings 44 through which the axle 30 passes.

Forming a part of the bottom conveyor auger 16 is the shaft 45 which extends at its ends through the front and back walls of the body and at the back end of this shaft it carries the two belt pulleys 46 and 47. The forward or front end of the shaft 45 passes through a discharge opening 48 in the front wall 18 and mounted upon the outer side of this front wall 18 and positioned over and conforming in interior diameter with the diameter of the opening is one arm of a substantially T-shaped foot 49 forming the lower end portion of the elevator structure which is generally designated 50. Such arm of this T-shaped boot 49 is designated 51 and is defined by the outwardly extending encircling flange 52 which is held against the wall 18 by a collar 53 which permits the boot 49 to rotate as will be readily obvious.

The opposite arm of the boot which is designated 54 is suitably closed and provided with a bearing, not shown, which receives an end of a power take-off shaft 55 which extends into the boot housing and, as is illustrated in FIG. 1, that end of the shaft 45 which extends into the boot housing 49 carries a bevel gear 56 while the end of the power take-off shaft 55 carries within the boot housing 49 the bevel gear 57.

The elevator structure 50 further includes the pipe 58 which is connected at one end by a swivel coupling 59 with the leg of the T-shaped boot housing designated 60. This upper portion of the elevator structure 50 is of conventional form and encloses the usual screw or auger unit 61, the lower end portion of which includes a shaft 62 upon which is mounted the bevel gear 63 positioned between and connecting together the gears 56 and 57.

In FIG. 1 the several bevel gears are shown uncovered or in the open, but it will be understood that in actual practice they may be enclosed in a known conventional manner in a suitable gear box which is here indicated in broken lines by the reference character 64 so that by so enclosing the gears the grain or other material passing into the elevator pipe will not be damaged. The top end of the elevator pipe carries the angled nozzle 65 which is swivelly connected with the pipe 58 so that it may be turned to various positions and, of course, it will be apparent that by the provision of the collar 53 and the swivel coupling 59, the elevator may be swung from its vertical position down to a horizontal position to extend from either side of the body structure.

The swivel coupling 59 is more or less conventional, embodying, as illustrated in FIG. 12, a split coupling ring 66 which encircles and holds together for relative turning movement a pair of flanges carried respectively by the lower end of the pipe 58 and the leg portion 60 of the boot housing 49. As shown in FIG. 12, the ends of the split coupling ring 66 are joined by nut and bolt fastening means 67 which when released, permits the separation of the coupled parts.

Extending longitudinally through the lower portion of the receptacle body is a pair of agitator units, stirrers or mixers, each of which is generally designated 68. These units are located in a common horizontal plane lying adjacent to the top of the horizontal lower auger or screw conveyor 16 and they are spaced apart in the horizontal plane to each lie in a vertical plane passing on one side of the auger 16. Each of the units preferably embodies four long blades 69 equi-distantly spaced around a circle as illustrated in FIG. 17, and the unit may be formed by placing together in back to back relation a pair of angle irons having the outer edges welded together as indicated at 70 and the ends of each of the units have secured thereto, to the ends of the blades 69, the disc plates 71 and 72.

The plate 71 of each unit 68 is located adjacent to the inner side of the front wall 18 and has secured to the center thereof the trunnion 73 which is mounted in a suitable bearing 74 in the adjacent wall.

The opposite or rear end of each of the agitator units is spaced from the back wall, as shown in FIG. 14, and the plate 72 thereof carries and has fixed to its center one end of a tubular shaft 75 which on its outer surface carries a series of longitudinally extending and outwardly projecting stirrer fins 76 and there is extended into each of these tubular shafts one end of a short driven shaft 77 which passes through a bearing 78 in the adjacent back wall and this shaft 78 at its forward end, that is the end thereof which extends toward the front wall and into the tubular shaft 75, is joined to the tubular shaft by a break pin 79.

The shafts 77 of the agitator units carry sprocket gears 80 which are coupled together by the cross sprocket chain 81 as shown in FIG. 2. One of the shafts 77 is connected through the medium of a suitable gear reduction unit, generally designated 82 and shown in FIG. 1, with a belt pulley 83 which is connected by a suitable belt 84 as shown in FIG. 2, with one of the pulleys carried on the auger shaft 45 as, for example, the pulley 46. Thus it will be seen that when the power take-off shaft 55 is connected with a suitable source of power such as the power delivering shaft of a tractor, for the rotation of the auger shaft 45, the rotary motion will be transmitted through the pulley 46 and from there through the gear reduction unit 82 to the adjacent one of the agitator shafts 77 to rotate the same and this rotary motion will be transferred, through the sprocket chain 81, to the other shaft 77.

By the provision of the break pins 79 which form a part of each of the agitator units, it will be seen that if either unit is jammed for any reason, no damage will be done to the unit since the pin 79 of that unit will break and the shaft 77 may then continue to rotate and transmit power to the shaft of the other unit.

Extending lengthwise within the lower portion of the receptacle body and above and in close proximity to the agitator units is a canopy structure generally designated 85 and which functions to distribute material laterally as it falls on the top of the canopy so as to guide the material to the outer sides of the underlying agitator units. This canopy structure is of inverted V formation, embodying the two plates or sections 86 which are attached at the ends of the canopy and at the joined or meeting edges of the plates to suspension pins 87 as shown in detail in FIG. 16 where one of such pins is illustrated in side elevation together with the about to be described mechanism for effecting the raising and lowering of the canopy with respect to the underlying agitator units and the underlying conveyor auger 16.

The suspension pins 87 at the ends of the canopy pass through vertical slots in the adjacent end walls, as illustrated in FIG. 16, where one of the slots is shown and designated 88. For effecting the raising and lowering of the canopy each of the suspension pins 87 at the outer end thereof, which is located outside of the receptacle, carries a threaded nut 89 and directly above the slot 88 the receptacle wall has secured thereto the outwardly projecting support bracket 90 having a suitable vertically directed opening through which extends the upper end of an elevating screw 91, the threaded lower end portion of which passes through and is in threaded connection with the underlying nut 89. Above the bracket the elevating screw is connected with a crank 92 by means of which its rotation can be effected.

In order to maintain a relatively close relationship between the ends of the canopy and the adjacent end walls of the receptacle, the canopy has secured across its ends the yieldable shield 93 which may be in the form of a body of relatively heavy fabric, rubber or the like which has wiping engagement with the surface of the adjacent end wall.

At the back end of the structure there is located an air heating and forced draft creating unit which is generally designated 94. The heating and draft creating or blowing unit comprises a pipe or tube 95 of relatively large diameter which is adapted to extend through the opening 96 in the back wall and into the interior of the receptacle body.

For the support of the pipe 95 there are provided within the receptacle body the horizontally spaced parallel tubular support rails 97 which are secured in a suitable manner to the front and back walls of the receptacle and are here shown as extending through such walls and removably maintained in position by nuts 98 threaded upon the outer ends of the rails as shown in FIG. 3. These tubular rails lie upon opposite sides of the heat pipe or tube 95 and the longitudinal axis of the pipe is located in the horizontal plane of the rails as shown in FIG. 1.

Adjacent to the outer and back end of the pipe, the latter has secured therearound a number of mounting bands 99. These bands are rigidly coupled by means of outwardly converging bracket arms 100, as shown in FIG. 6, with mounting rods 101 which are located on opposite sides of the heat tube or pipe and extend longitudinally thereof and in outwardly spaced relation therewith and slidably extend into the tubular guide rails 97. Thus by means of these support rods 101 the heat pipe is maintained in horizontal position on the longitudinal center of the receptacle body for in and out sliding movement.

Outward movement of the heat pipe may be limited in any suitable manner as, for example, by the attachment to its inner end of a removable stud or nut 102 as it is the purpose of the heat pipe mounting to facilitate the complete removal of the heat pipe from the structure for the employment of the latter in certain operations.

A portion of the back end of the heat pipe remains at all times outside of the receptacle body as shown in FIG. 1, 3 and 4 and the support rods 101 carry other elements of the heating structure.

Such other elements of the heating and draft creating structure comprises a motor driven fan and stove or torch for heating air driven through the pipe by the fan.

For the support of these elements from the outer or back end of the heat pipe, the bands 99 have secured thereto hanger arms 103 which support in a plane beneath the heat pipe the horizontally spaced longitudinally extending angle iron beams 104, portions of which beams project rearwardly beyond the outer and rear end of the heat pipe as shown in FIG. 4.

At a suitable location forwardly of the rear end of the heat pipe the angle iron beams 104 support the transverse yoke 105 and this yoke has mounted thereon the standard 106 which extends through a suitable opening in the wall of the heat pipe and supports within the heat pipe a heating unit which is here illustrated as being in the form of a conventional blow torch 107.

To facilitate the ignition of the fuel in the blow torch the heat pipe may be provided with a suitable door covered opening 108 in the lower part thereof and forwardly of the blow torch or heating device, as shown in FIG. 4.

The rearwardly extending ends of the angle beams 104 carry a platform 109 upon which is mounted a prime mover in the form of an electric motor 110, the axis of the rotor of which motor is disposed on the longitudinal axis of the heat pipe and is connected with a fan shaft 111 which extends into the rear end of the heat pipe and carries the fan 112 which is located directly behind the heating unit or torch 107 as shown in FIG. 4.

It will be understood that the angle beams 104 and the parts mounted thereon are suspended entirely from the rear end of the heat pipe and when the heat pipe is axially moved inwardly and outwardly with respect to the receptacle body, these beams and supporting parts move therewith.

The heat tube or heat pipe is adapted to extend into an enclosure or housing having a length approximating the inside length of the receptacle body and having foraminous walls and such housing or enclosure for the heat pipe is here generally designated 113. The foraminous walled housing or enclosure for the heat pipe may take several forms and one of such forms is shown in cross section in FIG. 8. Here it will be seen that this enclosure for the heat pipe may take any one of several polygonal cross sectional forms, for example, the quadrangular formation here shown, and embodies in one of the illustrated forms the two upper walls 114 and the two lower walls 115. In this form of the heat pipe enclosure or housing the four walls are all secured together and in the angle between the two upper walls 114 there is fixed the ridge beam 116 while the angle between each upper wall 114 and the adjacent lower wall 115 has fitted therein the longitudinally extending angle beam 117.

Fitted within the polygonal housing 114 are a series of circular rib bands 118 which are of a diameter to snugly receive the heat pipe or tube but are not in any way fixed to the tube. These rib bands are connected together by the top longitudinal strips 119 and they are also joined to the ridge beam 116 by the short upstanding posts 120 and to the side angle beams 117 by the upper and lower outwardly extending arms 121.

At the undersides of the bands 118 the lower edges of the lower or bottom walls 115 are reinforced by the longitudinal angle beams 122 and these are attached by the upstanding arms 123 to the rib bands 118, all as clearly shown in FIG. 8.

The vertically spaced arms 121 are designed to receive between them the tubular rails 97 so that the entire foraminous walled housing is supported upon these rails and the housing may be completely removed from within the receptacle body, as will be readily apparent, by the withdrawal of the rails 97 after the removal of the heat pipe.

The walls 114 and 115 between the longitudinal members 116, 117 and 123 may be formed of any suitable foraminous material such as a screen or reticulated fabric or metal plates having suitable small apertures therein. Also it will be readily apparent that the two upper angularly related walls 114 together form a hood above and immediately over the heat pipe.

The overall width of the hood formed by these two walls 114, or the overall width of the complete polygonal housing, is, of course, materially less than the width of the body between the side walls 12, so that grain or other material which may be dropped or showered down upon the hood or foraminous walled housing can flow off laterally against the downwardly convergent side walls 12 to be collected in the trough-like bottom wall in which the screw conveyor or auger operates.

The receptacle body or, as previously referred to, wagon body, is open above the side and end walls so that a free circulation of air may pass transversely between the upper panel portions 22 and 24 of the end walls. To further facilitate the movement of air currents through the receptacle body, the side walls 12 are provided with a multiplicity of air inlet openings 124 which, as shown in detail in FIG. 13, are covered by the inwardly and downwardly projecting lips 125 so that while air may enter through the side walls, the grain or other material flowing downwardly thereover cannot escape through the openings but will be deflected inwardly by these lips. Any suitable means may be employed for providing the opening covering or guarding lips, but the simplest means would be by subjecting the side walls of the receptacle, which are preferably formed of sheet metal of suitable weight, to the action of a punching tool which will cut the material to form the opening and at the same time press the cut-out portion inwardly in an obvious manner.

In order to rigidify the entire receptacle structure and also to allow for the use of sheet metal of a light gauge, the free edges of the side walls and of the end walls and also of the upwardly extending panels and plates which are integral with the end walls, may have secured thereto upon the inner sides thereof the bordering reinforcing angle beams 126.

To facilitate the removal of the foraminous walled housing structure 113 a handle may be secured to the ridge beam 116 as indicated at 127 or other means may be provided by which lifting mechanism can be attached to the housing to remove it from the receptacle after the tubular rails have been withdrawn, as previously stated.

FIG. 9 illustrates a modified or second embodiment of the foraminous walled housing 113 shown in FIG. 8. This modified housing construction is generally designated 128 and it is also of polygonal cross sectional form, embodying the upper walls 129 and the lower foraminous walls 130. However, in this modified construction the four walls are not all rigidly coupled together in the square configuration as in the construction shown in FIG. 8, but the adjacent top edges of the upper or top walls 129 are coupled together by a suitable number of pivotal or hinge couplings 131 so that they can be swung relative to one another as will be readily apparent.

The lower edges of the upper walls 129 are rigidly joined to the adjacent upper edges of the lower walls by suitable angle beams 132 in the same manner as in the previously described construction. However, in this modified construction there are not employed the rib bands such as those designated 118 in FIG. 8, and the angle beams 132 are secured to longitudinally extending rest beams 133 which are provided to position upon or rest on the top of the tubular rails 97.

The upper walls 129 are joined by the longitudinal strips 134 and the bottom edges of the lower walls 130 are reinforced by longitudinal bars 135 and these bars are adapted to be releasably coupled together by the pivoted tie bolt and wing nut assemblies 136, wherein it will be seen that one end of the bolt is pivoted to one bar 135 while the other end of the bolt is adapted to enter an inwardly opening edge slot in the opposite bar and when the wing nut is threaded upon the outer end of the bolt, the two bars will be drawn together to thereby close the two-part housing around the heat pipe. Thus closed, the housing will rest entirely upon the tubular rails 97 and when it is desired to remove the housing, the tie bolt assemblies will be released and the two sides of the housing each being made up of an upper wall 129 and a lower wall 130, may be swung apart so as to facilitate lifting the housing from the heat pipe and from the supporting tubular rails.

The walls 129 and 130, as in the previously described construction, may be of any suitable foraminous material which will permit the free circulation of air or hot air waves therethrough for contact with grain flowing downwardly over the sides of the upper walls.

Directly overlying the foraminous walled housing 113 or 128 and extending longitudinally of the receptacle body is a top or upper valved material distributing structure which is generally designated 137 and which is particularly illustrated in FIGS. 1, 4, 5, 10 and 11.

For the support of the structure 137 between the upwardly projecting plates 26 and 28 which respectively form continuations of the wall panels 22 and 24, there are provided longitudinally extending angle beams 138 which connect together the plates 26 and 28, being joined thereto at the top corners thereof.

Suspended from the longitudinal angle beams 138 is the auger trough 139, the lower portion of which is approximately semi-cylindrical in cross section, as indicated at 140, while the sides are substantially vertical, as indicated at 141.

The side walls 141 are secured in a suitable manner to the beams 138 as, for example, by turning over a flange portion 142 of each side wall onto the top of the adjacent beam and securing the flange to the beam by welding or any other suitable means. However, it will be obvious that the trough may be attached in other ways to the supporting beams. The trough 139 abuts at its ends the adjacent panels extending upwardly from the end walls and at the front end of the receptacle body there is supported upon the beams 138, a funnel or hopper 143 which discharges down into the trough and with which the nozzle 65 of the elevator cooperates in the manner illustrated in FIGS. 1 and 4 in the operation of circulating the material from the bottom of the receptacle body to the top thereof.

The auger trough 139 has formed in the bottom thereof a longitudinal series of discharge openings 144. These openings are preferably of diamond form as shown in FIG. 11 with the long axes of the openings extending longitudinally of the trough. At the back end of the trough the last opening is of somewhat larger size to permit rapid discharge of any material which may pile up therein, this last or end opening being designated 145, in FIG. 4.

The trough 139 has disposed therein the auger structure 146, the shaft 147 of which has bearing at its ends in the plates 26 and 28. At the back end of the structure the shaft 147 extends beyond the adjacent plate 28 and carries the belt pulley 148.

This belt pulley is connected through the medium of the belt 149 with one of two idler pulleys located upon the outer side of the back wall 20, adjacent to the top of the side wall 12. These two pulleys which are mounted upon a stub shaft 150 are designated 151 and 152, the belt 149 being connected with the pulley 151, as shown in FIG. 3. The other or outer one of the two pulleys, designated 152, is operatively connected by the belt 153 with the pulley 47 which is secured to the shaft 45 of the bottom auger.

For regulating the flow of material through the openings 144 in the top auger trough there is provided the elongate valve plate 154 which is of transversely arcuate form and positioned with the concave side uppermost and against the underside or semi-cylindrical bottom portion 140 of the trough 139 as shown in FIG. 5. This valve plate is bordered along its longitudinal edges by the angle bars 155 which have the double function of stiffening the plate and also providing a means for coupling suspension members or hangers thereto as well as providing a means for supporting a yoke element forming a part of the means for adjusting the position of the valve plate.

The suspension means for the valve plate 154 takes the form of a plurality of hanger rods 156 which have upper outturned end portions 157 which are rotatably supported in bearing sleeves 158 secured to the angle beams 138 as shown in FIG. 5. The bearing sleeves as illustrated are positioned with their axes transversely of the auger trough and the outturned end portions 157 of the hanger rods are directed outwardly through the sleeves so that the rods are free to swing in vertical planes paralleling the trough, but they cannot escape at their upper ends from the bearings.

The lower ends of the hanger rods 156 extend through holes or openings 159 in the flanges of the angle bars 155 and have threaded on their lower ends beneath the angle bars the adjusting and lock nuts 160 and 161 respectively and surrounding the lower ends of the rods and positioned or located between the nuts 160 and the apertured flange of the angle bar through which the rod passes are coil springs 162 which exert a constant upward thrust against the beams 155 to maintain the valve plate in engagement with the underside of the trough 139. These springs also function to permit necessary longitudinal movement of the valve plate for regulating the size of the discharge openings in the bottom of the auger trough and the valve plate for this purpose is provided along its longitudinal center with outlet openings 163 of the same diamond form as the openings 144 as shown in FIG. 11, and because of the spring suspension of the valve plate the hanger rods can swing in their bearings while at the same time maintaining the valve plate in close contact with the bottom of the auger trough.

At the back end of the receptacle body the valve plate has a terminal large opening 164 which cooperates with the larger outlet opening 145 in the bottom of the auger trough to permit excess material to be discharged.

The valve plate, as shown in FIG. 4, is shorter than the auger trough so that larger openings can be formed by shifting the valve plate forwardly by means of the adjustment device about to be described and as will be clearly seen upon reference to FIG. 4.

To facilitate the adjustment of the valve plate there is provided the depending frame 165 which hangs down beneath and extends across the valve plate and is attached at its two ends to the angle beams 155 as shown in FIG. 5 and this frame has either a threaded opening therethrough or is provided with an opening and a nut in line with the opening as indicated at 166 and midway between the ends of the frame, for the reception of the threaded crank shaft 167. The unthreaded portion of this shaft passes through an opening in the adjacent front wall and carries collars or the like as indicated at 168 to hold it against longitudinal movement and at its outer end the shaft has attached thereto a crank 169 by which it can be manually rotated.

It will be seen from the foregoing description that the agricultural machine herein illustrated and described can be readily transported from place to place by means of suitable connectors, not shown, between it and a draft vehicle, and that by the employment of a draft vehicle having the conventional power delivering shaft which can be connected with the power take-off or power receiving shaft 55, the several rotary units can be effectively driven.

In the use of the machine for treating grain for the purpose of reducing the moisture content thereof, the machine body can be filled at the harvesting area and then moved to a suitable place where power can be supplied to the motor 110 for the operation of the fan 112 and where a suitable source of fuel is available to supply the heater, shown here in the form of a blow torch, through the pipeline 107ª and suitable valve control means 107ᵇ, may be associated with the torch for controlling the flow of the fuel thereto, as shown in FIG. 6.

In the operation of the apparatus, for drying the grain, the heat pipe or tube 95 is slid rearwardly, the supporting rods 101 sliding in the tubular rails 97 until the inner end of the pipe is close to the opening 96 by which the pipe projects into the receptacle body. Thus the heat source is moved outwardly and there will not be had a strong concentration of heat adjacent to one end of the receptacle within the foraminous walled housing and a light concentration or head, or a lower temperature, at the opposite end, but the heat will be more evenly distributed throughout the housing which encases the heat pipe and through the grain which will be allowed during the heating operation to fall from the upper auger trough onto the foraminous walled housing to pass downwardly to the bottom of the receptacle body. During this procedure of creating the forced draft of heated air through the heat pipe and into the receptacle body, the lower auger will operate to move the grain to the lower end of the elevator structure 50 from which it will be discharged into the hopper 143 and from there into the upper auger trough 139. From here it will pass through the openings 144 at a desired rate controlled by the position of the valve plate 154 to fall on the sloping top walls of the underlying heat pipe encasing housing and, of course, it will be subjected to the effects of the heated air and will then pass down onto the canopy lying therebelow and be distributed laterally to the stirrers or mixer units.

The rate of discharge of the material from the canopy down to the rotating mixing units can be controlled by raising and lowering the canopy by the means described.

Where it may be desired to use the machine for the purpose of mixing feeds, the heat pipe can be withdrawn after removing the movement limiting lug 102 therefrom, to permit it to be withdrawn completely from the opening 96 and the foraminous walled housing 113 may then be taken out by withdrawing the tubular rails 97 in the manner described or in the case of using the housing 128 shown in FIG. 9, the two sides can be swung apart and the housing lifted from the supporting tubular rails. Suitable means may be provided for closing the opening 96 after the heat pipe has been withdrawn, such as the plate pivotally mounted on the back wall 20 to swing down over the opening or any other closure body may be made use of and since such an arrangement will be readily obvious, no illustration is made of a specific closing means.

With the heat pipe and the foraminous walled housing removed it will be seen that when the wagon body or receptacle body is charged with a feed mixture, it may be thoroughly stirred by operating the lower and upper augers with which cooperate the rotating agitators 68 positioned below the lower edges of the plate members forming the canopy structure 85. In this case also the rate of mixing can be controlled by elevating or lowering the canopy as it will be seen that due to the outward slope of the side walls 12 raising the canopy will result in increasing the space between the plates 86 thereof and the side walls, or lowering the canopy will result in decreasing this space through which the feed material must pass to the agitators and the lower auger.

Also while no covering means has been illustrated, it will be obvious that there it may be necessary to use the machine out of doors during rainy weather, suitable covering structure such as a tarpaulin or the like may be draped over the top thereof to hang down across the top edges of the side walls 12 and thus prevent rain getting into the receptacle.

I claim:

1. An agricultural machine comprising in combination, a wagon body having downwardly converging side walls joined to form a longitudinal trough bottom, front and back end walls, means supporting the body for movement over the ground, an auger conveyor positioned in said trough bottom for moving material to one end of the body, a top trough structure supported at an elevation above and paralleling said trough bottom, means for transferring material from said one end of the body into one end of said top trough, cooperating means associated with the top trough for moving material therealong and discharging the material downwardly into the body to be received in the trough bottom, an inverted elongate V canopy disposed longitudinally of and in close proximity to said auger conveyor, said canopy having the longitudinal edges of the downwardly divergent sides thereof directed toward and spaced from the downwardly converging side walls of said body, means supporting the canopy for vertical adjustment whereby the space between the said longitudinal edges thereof and the body wall may be changed, material agitating means extending longitudinally of each longitudinal edge of the canopy below and inwardly of such edge, and the last means comprising a large diameter tube extending at one end into the body through an end wall thereof, means for supporting the tube for longitudinal in-and-out adjustment, and means supported by the outer end of and movable with said tube for creating a forced draft of air from said outer end for discharge through the inner end thereof.

2. An agricultural machine comprising in combination, a wagon body having downwardly sloping side walls, a bottom wall in the form of a trough and front and back end walls, the back end wall having a material discharge opening in line with the trough, means in the trough for moving material through the opening, means connected with said opening for receiving and conveying material to a higher elevation, means for receiving material from the last means at the higher elevation and discharging it downwardly into the body along a path lying perpendicular to the end walls, a pair of parallel supports lying in a common horizontal plane and extending from the front to the back walls, an air tube extending into the body through an opening in the back wall and mounted upon said supports for in-and-out adjustment, a foraminous cover supported in overlying relation with said tube for deflecting laterally in the body material falling from the downwardly discharging receiving means, and means for forcing a draft of air through said tube into the body.

3. The invention according to claim 2, wherein said pair of supports comprises tubular guides and the mounting of said air tube thereon includes a pair of rods secured to the tube at the outer side of said back wall and slidably supported in the tubular guides.

4. The invention according to claim 2, wherein said foraminous cover has a lower foraminous part connected thereto and extending to the underside of the air tube.

5. The invention according to claim 3, wherein the tubular guides form the support for the foraminous cover.

6. An agricultural machine comprising in combination, a receptacle body having downwardly converging side walls and front and back end walls, said back wall having an opening therethrough, a pair of tubular rails within the body between and supported at their ends by the front and back walls and positioned on opposite sides of said opening, said rails opening through the back wall, an air pipe extending at one end into the body through said opening, rods positioned along opposite sides of the pipe and secured thereto at the outer side of the body, said rods being slidably extended into the tubular rails and movably supporting the air pipe, a heating unit supported in the pipe adjacent to the other end thereof, means supported by the pipe at said other end for blowing air through the pipe, a foraminous deflector means supported in the body in overlying relation with the pipe and extending between said end walls, and means for circulating material from below the air pipe and deflector to the upper part of the body and discharging it downwardly over said deflector means.

7. The invention according to claim 6 wherein the said tubular rails provide the support for the deflector means.

8. The invention according to claim 6, wherein the said tubular rails provide the entire support for the deflector means and said deflector means being demountable from the rails.

9. The invention according to claim 6, wherein the said deflector means includes parts extending downwardly beneath the said one end of the air pipe to form an elongate housing into which the air pipe may be extended and said downwardly extending parts being in the form of foraminous walls.

10. An agriculture machine comprising in combination, a receptacle body having downwardly converging side walls, and front and back end walls, said back wall having an opening therethrough, a pair of tubular rails within the body between and supported at their ends by the front and back walls and positioned on opposite sides of said opening, said rails opening through the back wall, an air pipe extending at one end into the body through said openings, rods positioned along opposite sides of the pipe and secured thereto at the outer side of the body, said rods being slidably extended into the tubular rails and movably supporting the air pipe, a heating unit supported in the pipe adjacent to the other end thereof, means supported by the pipe at said other end for blowing air through the pipe, an elongate foraminous walled housing supported longitudinally within the body between the end walls in a position to have the air pipe extended thereinto, said housing being of polygonal cross sectional form and having two sections thereof arranged to form a hood of inverted V-form over the air pipe, and means for circulating material from below the air pipe and deflector to the upper part of the body and discharging it downwardly over said deflector means.

11. An agricultural machine comprising in combination, a receptacle body having downwardly converging side walls and front and back end walls, said back wall having an opening therethrough, a pair of tubular rails within the body between and supported at their ends by the front and back walls and positioned on opposite sides of said opening, said rails opening through the back wall, an air pipe extending at one end into the body through said opening, rods positioned along opposite sides of the pipe and secured thereto at the outer side of the body, said rods being slidably extended into the tubular rails and movably supporting the air pipe, a heating unit supported in the pipe adjacent to the other end thereof, means supported by the pipe at said other end for blowing air through the pipe, an elongate housing of polygonal cross sectional form and adapted to extend between the front and back walls of the body, said housing having two formaminous top walls arranged as an inverted V and at least two foraminous lower walls joined to the top walls and arranged in downward convergent relation, said housing enclosing said tubular rails, means supporting the housing on the tubular rails in line with said back wall opening to receive the air pipe, and means for circulating material from below the air pipe and deflector to the upper part of the body and discharging it downwardly over said deflector means.

12. The invention according to claim 11, wherein the said means supporting the housing on the tubular rails embodies bracket elements secured to the interior of the housing adjacent to the area of joinder between the top and lower walls, the bracket elements resting upon the tubular rails and facilitating removal of the housing from the rails and from the receptacle body.

13. The invention according to claim 12, with means hingedly joining together the said two foraminous top walls whereby opposite sides of the housing may be swung apart to open the housing for said removal from the rails and from the body, and means for detachably coupling together the lower portions of the housing lower walls.

14. The invention according to claim 6, wherein the last stated means comprises mechanism in the bottom portion of the receptacle body for moving material therein longitudinally of the body to and through an outlet opening in one end wall, a trough supported in the top portion of the body and extending through the length of the latter, a conveyor auger rotatably supported in said trough, a hopper supported above and discharging into the trough at the end of the latter adjacent to said one end wall, an elevator mechanism for receiving material from said outlet opening and conveying the same to and discharging it into said hopper, said trough having bottom outlet openings throughout the length thereof, and means for regulating the flow of material through said trough outlet openings.

15. The invention according to claim 6, wherein the last stated means comprises mechanism in the bottom portion of the receptacle body for moving material therein longitudinally of the body to and through an outlet opening in one end wall, a trough supported in the top portion of the body and extending through the length of the latter, a conveyor auger rotatably supported in said trough, a hopper supported above and discharging into the trough at the end of the latter adjacent to said one end wall, an elevator mechanism for receiving material from said outlet opening and conveying the same to and discharging it into said hopper, said trough having bottom outlet openings throughout the length thereof, an elongate valve plate extending lengthwise of said trough in sliding engagement with the bottom thereof, said valve plate having openings adapted upon movement of the plate in one direction to be registered with the trough outlet openings, and means for adjustably moving the valve plate for selective opening and closing of the trough outlet openings.

16. The invention according to claim 6, wherein the last stated means comprises mechanism in the bottom portion of the receptacle body for moving material therein longitudinally of the body to and through an outlet opening in one end wall, a trough supported in the top portion of the body and extending through the length of the latter, a conveyor auger rotatably supported in said trough, a hopper supported above and discharging into the trough at the end of the latter adjacent to said one end wall, an elevator mechanism for receiving material from said outlet opening and conveying the same to and discharging it into said hopper, said trough having bottom outlet openings throughout the length thereof, an elongate channel shaped valve plate extending lengthwise of the underside of said trough with the bottom portion of the trough positioned therein and in contact therewith, the valve plate having openings in longitudinal array in the bottom and positioned to be brought into and out of registry with the trough openings upon longitudinal movement of the valve, means along the longitudinal sides of the valve plate supporting the latter and maintaining the valve plate in sliding contact with the trough, and means at and coupled to one end of the valve plate for imparting longitudinal reciprocal movement thereto.

17. The invention according to claim 16, wherein the valve plate supporting means includes hanger rods pivotally supported along the longitudinal sides of the trough, and spring supports interposed between the lower ends of said rods and side portions of the valve plate.

18. An agricultural machine comprising in combination, a wagon body having side walls, a bottom wall formed to provide a trough and front and back end walls, said trough extending from and between the front and back walls, means in the trough for moving material to one end thereof, means for receiving material from the said one end of the trough and conveying the material to a higher elevation, means at said higher elevation for receiving material from said last means and discharging it downwardly into the body toward said trough, a pair of parallel supports lying in a common horizontal plane and extending from the front to the back walls, an air tube extending into the body through an opening in the back wall and mounted upon said supports for in-and-out adjustment, a foraminous cover supported in overlying relation with said tube for deflecting laterally in the body material falling from the downwardly discharging receiving means, and means for forcing a draft of air through said tube into the body.

References Cited in the file of this patent
UNITED STATES PATENTS

| | | |
|---|---|---|
| 586,111 | Amendt | July 13, 1897 |
| 865,546 | Ulhorn | Sept. 10, 1907 |
| 2,410,851 | Welty | Nov. 12, 1946 |
| 2,509,175 | Sohanin | May 23, 1950 |
| 2,679,114 | Morrison | May 25, 1954 |
| 2,706,345 | Arndt | Apr. 19, 1955 |
| 2,715,781 | Sproul | Aug. 23, 1955 |
| 2,772,487 | Arndt | Dec. 4, 1956 |
| 2,962,818 | Forth | Dec. 6, 1960 |